UNITED STATES PATENT OFFICE.

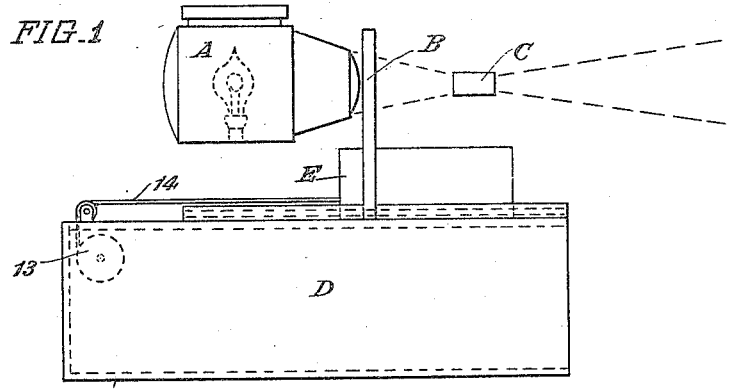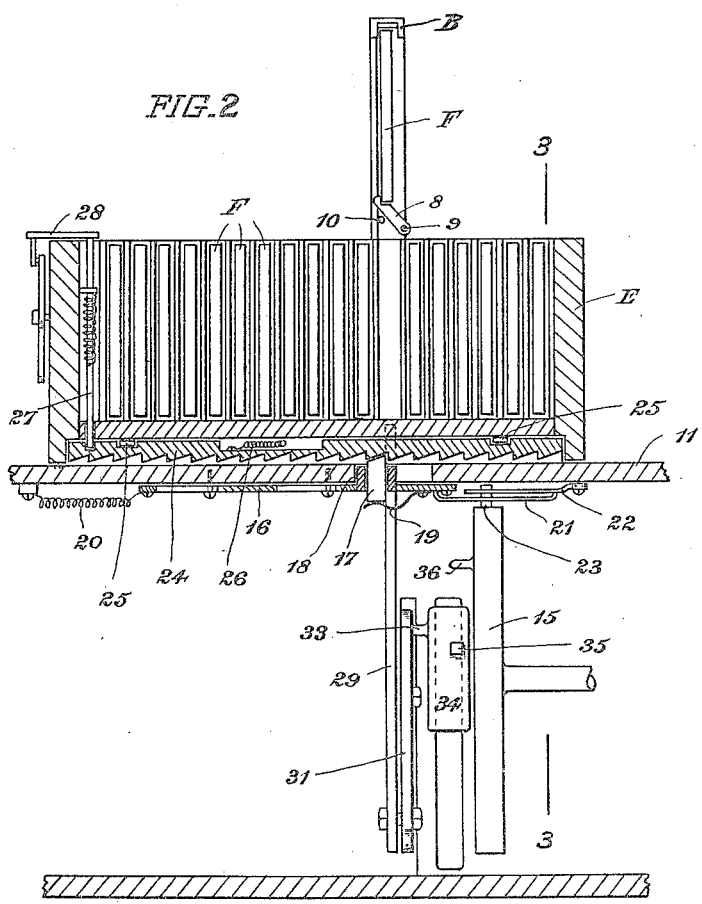

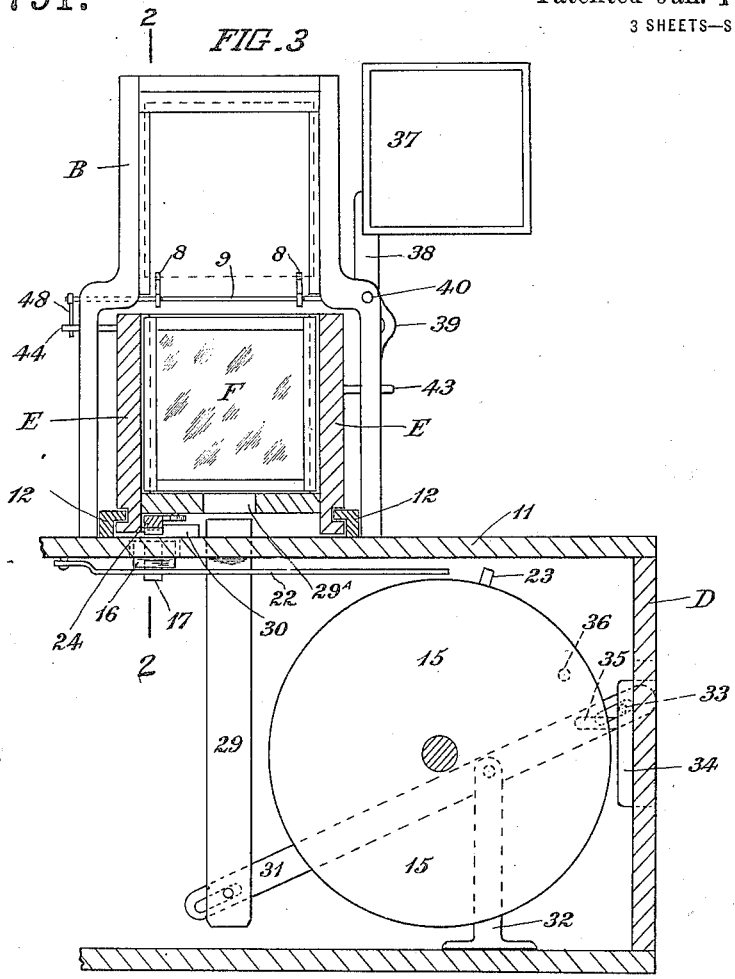
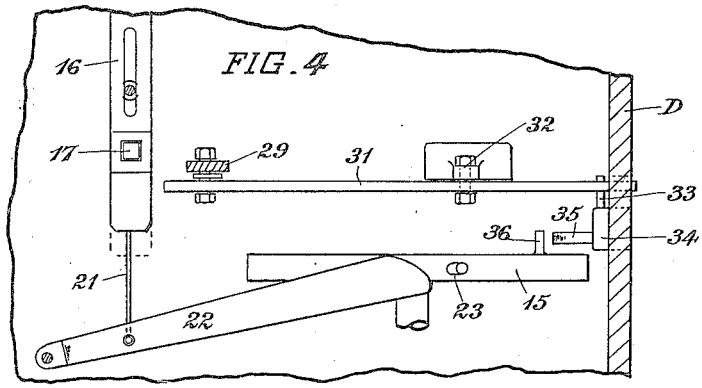

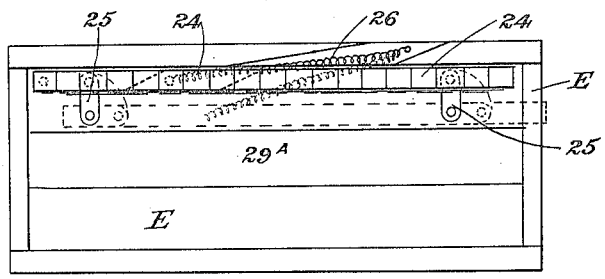
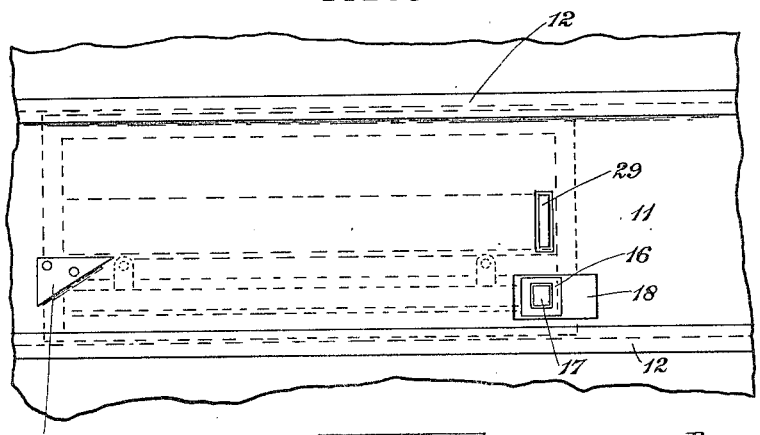
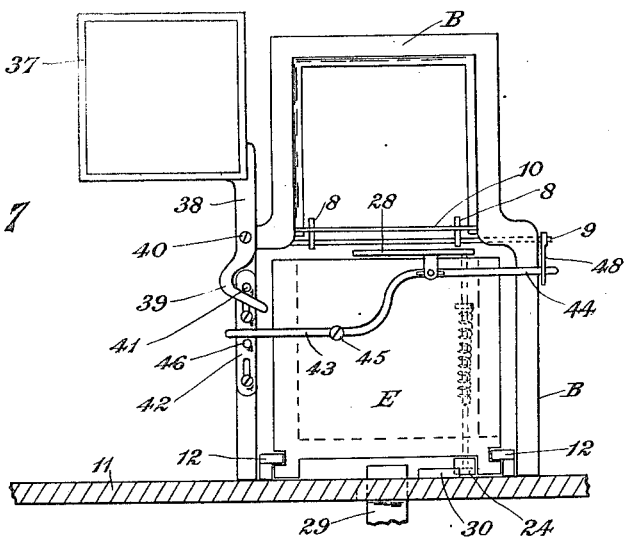

PERCIVAL ERNEST PETHERICK, OF GISBORNE, NEW ZEALAND.

MEANS FOR AUTOMATICALLY DISPLAYING LANTERN SLIDES.

1,402,791.      Specification of Letters Patent.     Patented Jan. 10, 1922.

Application filed March 8, 1919. Serial No. 281,512.

*To all whom it may concern:*

Be it known that I, PERCIVAL ERNEST PETHERICK, subject of the King of Great Britain, residing at Gisborne, New Zealand, have invented a new and useful Means for Automatically Displaying Lantern Slides; and I do hereby declare the following to be a full, clear, and exact description of the same.

This invention relates to the provision of improved means whereby any desired number of lantern slides may be automatically displayed one by one in proper rotation or order. The improvements are particularly adaptable for the displaying of a number of advertisements on a screen and useful in picture theatres and other like places for displaying such advertisements between programmes, and for such operations being carried out automatically, thereby leaving the lantern attendant free to deal with other matters.

The means devised for this purpose consist broadly in the combination with any of the approved forms of lanterns, of a slide containing box mounted to travel beneath the lantern and to position slides arranged therein, one by one beneath the display slide holder of the lantern, as the box is moved step by step in its travel, and mechanism whereby the slide box is thus moved step by step, and whereby in between each movement, the slide then in position beneath the lantern slide holder is raised into the slide holder for display, at the same time displacing the slide before it and causing such slide to drop back into its position in the box.

The means thus acting may have combined with them, a single side carrier holding a slide (hereinafter referred to as the "stand by" slide) which when the last of the series of the slides in the box has been displayed, is moved into display position while the slide box is positioned to re-commence the display of the series of slides within it, when it is displaced by the first slide of the series as it is lifted into the display position.

In fully describing the invention reference will be made to the accompanying drawings, in which:—

Figure 1 is a diagrammatic side elevation of the means employed, showing the relative arrangements of the working parts.

Figure 2 is an enlarged longitudinal section of the invention, the section being taken on the line 2—2 of Figure 3.

Figure 3 is a front cross sectional elevation of the invention taken on the line 3—3 of Figure 2.

Figure 4 is a plan of the operative mechanism.

Figure 5 is an underneath plan of the slide box.

Figure 6 is a plan of the slide box base or carrier.

Figure 7 is a back end elevation of the slide box and slide holder showing the stand by slide and the means for actuating it.

Referring to Figure 1, A represents the lantern, B the slide holder mounted in front thereof and C the condenser for use in projecting the picture. These appliances are of any of the known and approved types, saving only that the slide holder B must be so constructed as to receive the slide through the bottom and to permit of it being tilted forward at its bottom edge to drop out. It is therefore furnished with one or more supporting cams 8 (Figures 2 and 3) which are fixed upon a rod 9 mounted in the sides of the holder near its bottom and which incline backwards against a stop 10. These cams lie beneath the slide space in the holder and are lifted by the slide passing up into the holder allowing the slide to pass behind them, and then drop back so that the slide bottom rests upon them. Then when another slide is moved up for display, the lifting of the cams will tip forward the lower edge of the slide already in position so that it will drop off the cams and down out through the front of the holder.

In this invention a casing D to contain the operating mechanism is provided and arranged beneath the lantern A, such casing having a flat top or platform 11 having guides 12 extending longitudinally thereon and in the line of the lantern's axis. Within these guides is mounted a slide containing box E which is so mounted as to move freely back and forth on the platform passing also beneath the slide holder B which is suitably mounted on the said platform to permit of the free movements of the slide box. The slide box is constructed to provide for the slides to be displayed, represented by F, being arranged vertically within it and transversely across it, one behind the other in the order of their display, each slide being loosely fitted at its side edges into grooves formed in the box sides to receive it in the well known way.

The expression "slide", in this specification, is meant to include any of the usual forms of slides employed in lantern projection, whether entirely composed of glass or of glass mounted in a wooden or other framing.

The slide box E is drawn normally to the rear limit of its travel by means of a spring drum 13 mounted within the casing D and having a flexible wire connection 14 wound thereon and leading to the back end of such box. When in this rearward position, the front slide in the box will be positioned precisely beneath the slide holder B, so that upon such slide being lifted, it will be raised into the holder and supported therein by the cams 8 as before described.

Mechanism is provided for moving the slide box forward step by step through distances equal to the slide divisions of the slide box and, between each of such movements, for lifting the slide for the time being beneath the holder B, up into such holder and at the same time for displaying the slide already therein so that it may slip down and back into its division of the slide box. The feeding mechanism is so designed that after the last slide of the series has been displayed, the slide box is automatically freed from such mechanism so that it may be drawn back by the spring drum 13 to the starting position, and then again engaged by such mechanism to repeat the showing of the slides.

The mechanism referred to is contained within the casing D and consists in a motor of any approved design and driven by any suitable power that rotates a disc wheel 15 in a plane of rotation parallel to the slides. Attached to the inside top of the casing is a bar 16 that is capable of moving to and fro in a longitudinal direction and is provided with a pawl 17 mounted therein, said pawl being caused to project upwards through a slot 18 in the casing top by the action of a controlling spring 19. A spring 20 is attached to the back end of the bar 16 and draws such bar normally backward to the rear limit of its movement. The forward end of the bar is connected by the link 21 with an arm 22 that is pivoted to the underside of the casing top and extends across above the periphery of the disc wheel 15 with one of its edges at an angle to the line of such wheel, as shewn clearly in Figure 4. A pin 23 is fitted to project from the periphery of the wheel and is adapted as the wheel rotates to engage the edge of the arm 22 and turn the arm on its pivot, thereby drawing the bar 16 forward against its spring for a fixed distance, and then as the pin passes on and frees such edge, to allow the bar to be drawn back and at the same time again position the arm to be engaged by the pin 23 on the next rotation of the wheel. Thus each rotation will impart a forward movement to the bar and its pawl and then free them to move rearward, the throw of the lever 22 being regulated to give movement to the bar 16 sufficient to feed the slide box through one step of its travel.

Attached to the bottom of the slide box is a ratchet bar 24 that extends longitudinally within a recess formed for that purpose and the teeth of which face downward and are spaced apart in correspondence with the distances between the slide grooves of the slide box. This ratchet bar is attached to the box by means of links 25, arranged one at each end, and pivoted respectively to the box bottom and the bar, so that the bar may move transversely across the box within the limits of the link's length. A spring 26 is provided and has one end secured to the ratchet bar and the other to one edge of the box so that the tension thereof will normally draw the bar across towards the middle line of the box, as indicated by the dotted lines in Figure 5. The full lines represent the working position of the bar, in which it is in the line of the pawl 17 projecting up through the top of the casing so that the movements of such pawl will feed the slide box forward one tooth on each rotation of the wheel 15, the pawl by reason of its spring 19, sliding freely over the ratchet teeth on its rearward movement.

The ratchet bar is retained in its working position by means of the spring pin 27 (Figure 2) extending vertically downward within the box at its rear end and projected by means of a spring, through an aperture in the box bottom, into a notch formed in the upper side of the ratchet bar to receive it. This pin, at its upper end is attached to a plate 28 that overhangs the inside of the box at its rear end and is adapted to be engaged by a lifting bar 29 (to be hereinafter described) on the rotation of the disc wheel 15 succeeding that on which the last slide of the series has been raised into display position, and lifted so as to lift the pin 27 to free the ratchet bar and thereby allow its spring 26 to draw it across free of the pawl 17 so that the slide box will be drawn back to its starting position. As the said box nears the end of its rearward travel, the ratchet bar engages a deflecting plate 30 (shewn specially in Figure 6) fixed to the top of the casing which deflects it sideways again into the working position so that it will be caught and retained by the pin 27 which has been freed to drop by the lowering of the lifting bar 29.

The lifting of each slide into display position, as it comes into position beneath the slide holder B, is effected by the operation of the lifting bar 29 that is made of flat section and is mounted vertically in the casing D so as to move up and down in a truly vertical plane and in its upward movement to pass through a slot 29ᴬ formed along the length of the slide box bottom and to engage the bottom edge of the slide and raise the slide from the box to the necessary height in the slide holder. This bar is raised and freed to drop after each movement of the slide box by means of the mechanism shewn particularly in Figures 3 and 4. This mechanism consists in a rocking lever arm 31 that extends transversely across within the casing D and is pivoted between its ends to a fixture 32. One end of this arm 31 is pivotally attached to the bottom end of the lifting bar 29, while its upper end is articulated upon a pin 33 projecting sideways from a block 34 mounted to slide up and down in the adjacent side of the casing. Projecting outwards from the said block is a finger 35 that extends far enough to overlap one side of the disc wheel 15. A pin 36 is fixed to project from the corresponding side of this wheel so that in rotation of the wheel, the pin will engage the finger 35 (the block 34 being raised to lift that end of the rocking arm 31 and to correspondingly lower the other end and the attached lifting bar) and will force such finger and the block down, so as thereby to raise the lifting bar, until the pin passes over the end of the finger, when the block will be freed and the weight of the bar and its end of the arm will cause them to drop back again and the block to be raised ready to be again engaged by the pin on the next rotation of the disc wheel 15.

The length of the finger 35 and the position of the block 34 are so adjusted that the downward movement imparted to the block before it is released, is the amount required to raise the other end of the arm sufficiently to lift the lifting bar through the distance necessary to engage and raise a slide into the slide holder B in the required manner.

The two pins 23 and 36 are so adjusted in relation to each other that in the rotation of the wheel, the pin 36 will first operate to lift the slide and then after nearly a full rotation the pin 23 will actuate the slide box feeding mechanism to bring the next slide into position such slide then being raised, displacing the first slide which will fall back into its groove in the box, which has been moved forward from beneath the holder into the position to receive it. These operations will then continue automatically throughout the display of the full series of slides and repeating such display any number of times without attention. The period of display for each slide is governed by the rate of rotation of the disc wheel 15.

The "stand by" slide adjunct to the apparatus is constituted by a frame 37 (Figures 3 and 7) that is carried on a two armed lever 38—39 pivoted at 40 to one side of the slide holder B, one arm of which 38 extends upwards and carries the frame in which the slide is mounted. This arm is made of such a length and the pivot point 40 so adjusted that when the arm is upright, the slide will be held clear of the holder, and when said arm is turned down and in, the slide will be positioned in the display position in the holder. The other arm 39 of the lever extends downwards and is curved to underlie a pin 41 projecting out from a plate 42 mounted to slide up and down in the holder frame, when such plate is at its upper position and the lever is turned to hold the slide clear, in the manner shewn in Figure 7. A second two armed lever 43—44 is pivoted at 45 on the back end of the slide box, its two arms extending normally in a horizontal plane so that, when the slide box reaches the limit of its forward travel, its outer arm 43 will project across the plate 42 and overlie a second pin 46 projecting out therefrom. Its inner arm 44 is connected to the plate 28 resting on the back edge of the slide box so that when such plate is raised by the lifting bar 29 to free the slide box ratchet from its pawl in the manner already described, this end of the lever will also be lifted. The outer end 43 is thereby depressed and bearing on the pin 46 will move the plate 42 downward so that its pin 41 engaging the curved arm 39 of the lever arm 38—39 will turn such arm outward, thus turning the other arm 38 inward and causing the slide to fall into the holder in the manner described. In this case the last slide of the slide box series is first displaced so as to fall back into its groove in the slide box by the end of the lever arm 44 engaging a crank arm 48 fixed on the end of the rod 9 that carries the slide holding cams 8 and turning said cams to tilt the slide out of the holder.

The stand by slide will then remain in this position until the slide box has returned to its rear position and the first slide in the box is raised by the lifting bar, such slide then engaging the stand by slide and turning it up and out on its pivoted arm until its weight has passed the centre of gravity when it will fall right over to the normal position. The lower arm 39, turning inward, will engage the pin 41 and raise the plate 42 to its raised position ready to be again depressed by the lever 43—44 at the end of the next display of the slide series. This lever will itself be returned to the normal position by the falling of the plate 28 to which it is connected.

Any approved apparatus for cutting off the lantern light during the changing of the slides may be used in the well known way.

I claim:—

1. In projection apparatus, the combination, with a slide-containing box, of means for feeding the slide box forward, consisting of a ratchet bar attached to and extending along the underside of said slide box, a supporting platform upon which the slide box is movably mounted, a bar attached to the said platform and adapted to move lengthwise in the line of the ratchet bar, a pawl carried by the second-named bar and engaging the ratchet bar teeth, a spring normally drawing the pawl bar to a rearward position, a rotatable disc, a pin on the periphery thereof, and a lever arm connected to the pawl bar adapted to be engaged and turned forward by the said pin on the rotation of the disc, and to draw the pawl bar forward correspondingly, substantially as specified.

2. In projection apparatus, the combination, with a slide-containing box, of means for feeding the slide box forward, consisting of a ratchet bar disposed beneath the slide box bottom, articulated links connecting said bar to said box bottom to allow a transverse movement of the said bar, pawl-carrying feeding means cooperative with said bar, a spring normally drawing the bar to one side clear of the feeding pawl, a catch for holding said bar in the line of such pawl, means whereby the bar is released from the said catch, after the slide box has been drawn forward to its limit of movement, so that the bar is drawn clear of the pawl, and means upon the supporting platform for forcing the said bar back to be held by the catch when the slide box reaches the rearward limit of its movement, substantially as and for the purposes specified.

3. In projection apparatus, the combination, with slide holder, a slide-containing box movable therebeneath, and mechanism for transferring the slides one at a time from the slide box to the holder; of an auxiliary slide carrier pivoted at one side of the slide holder; and mechanism for automatically moving said carrier into the holder after the last slide in the slide box has been displayed in said holder.

4. In projection apparatus, the combination, with a slide holder, a slide-containing box movable forwards and backwards therebeneath, and mechanism for transferring the slides one at a time from the box to the holder during the forward movement of the box; of an auxiliary slide carrier pivoted at one side of the slide holder; and mechanism for automatically moving said carrier into the holder at the completion of the forward movement of the slide box, said carrier being automatically moved out of said holder after the slide box has been moved backward and has commenced its next forward movement.

5. In projection apparatus, the combination, with a slide holder, a slide-containing box movable therebeneath, and mechanism, including a lifter bar, for transferring the slides one at a time from the slide box to the holder; of an auxiliary slide carrier pivoted at one side of the slide holder; and a lever system operated automatically by the lifter bar for moving said carrier into said holder after the last slide in the slide box has been displayed in the holder; said lifter bar operating through the intermediary of the first slide in the slide box to move said carrier out of said holder after the slide box has been moved backward and has commenced its next forward movement.

In testimony whereof I have signed this specification in the presence of two subscribing witnesses.

PERCIVAL ERNEST PETHERICK.

Witnesses:
ETHEL FRANCES COURTNEY,
JAS. T. HUNTER.